United States Patent [19]

Poittevin et al.

[11] 4,027,030
[45] May 31, 1977

[54] CERTAIN THIAZOLE-CARBOXAMIDES AND THEIR PHARMACEUTICAL UTILITY

[75] Inventors: Andre Poittevin, Vaires-sur-Marne; Robert Fournex, Paris; Michele Dagnaux, Fontenay-sous-Bois, all of France

[73] Assignee: Roussel-UCLAF, Paris, France

[22] Filed: Feb. 20, 1976

[21] Appl. No.: 659,760

[30] Foreign Application Priority Data

Feb. 28, 1975 France .............................. 75.06247
Dec. 12, 1975 France .............................. 75.39703

[52] U.S. Cl. .......................... 424/270; 260/302 R
[51] Int. Cl.² .................................... C07D 277/30
[58] Field of Search ................. 260/302 R; 424/270

[56] References Cited

UNITED STATES PATENTS 3,872,124   3/1975   Le Martret et al. ........... 260/302 R
3,882,110   5/1975   Clemence et al. ............. 260/302 R Primary Examiner—R. J. Gallagher
Attorney, Agent, or Firm—Hammond & Littell

[57] ABSTRACT

Novel thiazole carboxamides of the formula

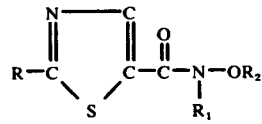

wherein R, $R_1$ and $R_2$ are individually selected from the group consisting of hydrogen and alkyl of 1 to 6 carbon atoms and their non-toxic, pharmaceutically acceptable acid addition salts having a marked antilipolytic activity as well as vasodilatatory and hypoglycemic activity and their preparation.

15 Claims, No Drawings

CERTAIN THIAZOLE-CARBOXAMIDES AND THEIR PHARMACEUTICAL UTILITY

STATE OF THE ART

U.S. Pat. No. 3,872,124 describes certain thiazole carboxamides having α-adrenolytic and sedative activity but these compounds are more complex than the compounds of formula I. French application published under the No. 2,261,756 also describes complex thiazolecarboximides having hypotensive and antihypertensive activity.

OBJECTS OF THE INVENTION

It is an object of the invention to provide the novel compounds of formula I and their non-toxic, pharmaceutically acceptable acid addition salts and their preparation.

It is another object of the invention to provide novel hypolipemiant compositions and a novel method of inducing hypolgycemic activity in warm-blooded animals.

These and other objects and advantages of the invention will become obvious from the following detailed description.

THE INVENTION

The novel compounds of the invention are thiazole-carboxamides of the formula

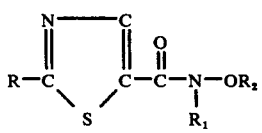

wherein R, $R_1$ and $R_2$ are individually selected from the group consisting of hydrogen and alkyl of 1 to 6 carbon atoms and their non-toxic, pharmaceutically acceptable acid addition salts.

Examples of suitable alkyl groups of 1 to 6 carbon atoms are methyl, ethyl, n-propyl, isopropyl, n-butyl, isobutyl, ter.-butyl, pentyl and hexyl.

Examples of suitable acids for the production of the acid addition salts are strong mineral acids such as hydrochloric acid, hydrobromic acid, hydroiodic acid, niric acid, sulfuric acid or phosphoric acid and organic sulfonic acids such as alkylmonosulfonic acids like methane sulfonic acid, ethane sulfonic acid and propane sulfonic acid, alkyldisulfonic acids like methane disulfonic acid, α,β-ethane disulfonic acid and α,β-propane disulfonic acid and arylmonosulfonic acids such as benzenesulfonic and aryldisulfonic acids.

Among the preferred compounds of formula I are those wherein R is alkyl of 1 to 6 carbon atoms and $R_1$ and $R_2$ are individually hydrogen or alkyl of 1 to 6 carbon atoms and their salts. Particularly preferred are those where $R_1$ is hydrogen. Specific basic compounds are N-hydroxy-2-methyl-5-thiazolecarboxamide, N-methoxy-2-methyl-5-thiazolecarboxamide and N-methoxy-N,2-dimethyl-5-thiazolecarboxamide.

The novel process of the invention for the preparation of the thiazole carboxamides of formula I comprises reacting a compound of the formula

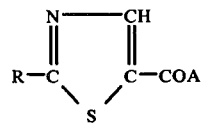

wherein R has the above definition and A is a halogen with a compound of the formula

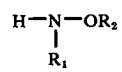

wherein $R_1$ and $R_2$ have the above definition to form the corresponding compound of formula I which may be reacted with a strong mineral acid or an organic sulfonic acid to form the corresponding non-toxic, pharmaceutically acceptable acid addition salt.

The acid halide of formula II may be the bromide or chloride but is preferably the chloride and the compound of formula III is preferably used in the form of its salt such as its sulfate or hydrochloride. The reaction is preferably effected in an organic solvent such as methylene chloride, chloroform, benzene, toluene, tetrahydrofuran, cyclohexane or ether and in the presence of an organic base such as pyridine, collidine or triethylamine.

Another method of preparing the compounds of formula I in which $R_1$ and $R_2$ represent a hydrogen atom comprises reacting a compound of the formula

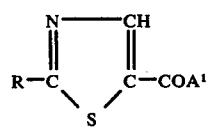

wherein R has the above definition and $A^1$ is alkoxy of 1 to 2 carbon atoms with hydroxylamine to form the corresponding compound of formula I.

In this latter reaction, the reaction is preferably effected in the presence of a basic agent such as mineral bases like sodium hydroxide or potassium hydroxide or an organic base such as pyridine, collidine or triethylamine. The reaction may be effected in an aqueous media or in an organic solvent such as methylene chloride, chloroform, benzene, toluene, tetrahydrofuran, cylcohexane or ethyl ether.

The compounds of formula II and IV are described in U.S. Pat. No. 3,700,677 and French application published under the No. 2,047,876 and may be made by other known processes.

The novel hypolipemiant compositions of the invention also possess vasodilatatory and hypoglycemic activity and are comprised of an effective amount of at least one compound of formula I or its non-toxic, pharmaceutically acceptable acid addition salts and a pharmaceutical carrier. The compositions may be in the form of simple tablets, dragees, gelules, granules, suppositories or injectable solutions or suspensions.

The compositions of the invention are useful for the treatment of warm-blooded animals, including humans, for acute or chronic hyperlipemia, coronary insufficencies, cardiac insufficencies of atheromatosis origin, chronic angina states, functional troubles of hypertension and prediabetic and diabetic states.

The pharmaceutical carrier used in the compositions may be those excipients ordinarily used in medicines such as talc, gum arabic, lactose, starch, magnesium stearate, cacao butter, aqueous or non-aqueous vehicles fatty bodies of animal or vegetable origin, paraffinic derivatives, glycols, diverse wetting agents or emulsifiers or preservatives.

The novel method of the invention for inducing hypoglycemic activity and antilipolytic activity in warm-blooded animals comprises administering to warm-blooded animals an effective amount of at least one compound of formula I or its non-toxic, pharmaceutically acceptable acid addition salt. The compounds may be administered orally, rectally or parenterally. The usual daily dose is 2 to 50 mg/kg by oral route for adult.

In the following examples there are described several preferred embodiments to illustrate the invention. However, it is to be understood that the invention is not intended to be limited to the specific embodiments.

EXAMPLE 1

N-hydroxy-2-methyl-5-thiazolecarboxamide 4.1 of hydroxylamine hydrochloride and 6.8 g of methyl 2-methyl-5-thiazolecarboxylate were added with stirring to a mixture of 6.g of sodium hydroxide pellets in 30 ml of water and the mixture was allowed to stand for 15 minutes. A mixture of 12 ml of concentrated hydrochloric acid and 12 ml of water were added there to and the mixture was iced and filtered to obtain 9 g of raw product. The product was crystallized from water, filtered and dried to obtain 4.4 g of N-hydroxy-2-methyl-5-thiazolecarboxamide melting at 164° C.

EXAMPLE 2

N-methoxy-2-methyl-5-thiazolecarboxamide

STEP A: potassium 2-methyl-5-thiazolecarboxylate 20 g of methyl 2-methyl-5-thiazolecarboxylate were added to a mixture of 100 ml of methanol and 20 g of potassium hydroxide pellets at room temperature and the mixture was stirred for 1 hour and then was filtered. The recovered precipitate was washed with methanol and then ethyl ether to obtain 21.3 g of potassium 2-methyl-5-thiazolecarboxylate.

STEP B: 2-methyl-5-thiazolecarboxylic acid chloride

A mixture of 21 g of the product of Step A in 500 ml of anhydrous benzene was cooled on a melting ice bath and 9.9 ml of oxalyl chloride were added thereto dropwise. The mixture stood for 1 hour and was then stirred at room temperature for one hour and was filtered. The filtrate was evaporated to dryness under reduced pressure to obtain 21 g of raw 2-methyl-5-thiazolecarboxlic acid chloride.

STEP C: N-methoxy-2-methyl-5-thiazolecarboxamide

A solution of 21 g of the product of Step B in 210 ml of methylene chloride was added dropwise to a mixture of 19 g of O-methyl hydroxylamine hydrochloride, 500 ml of methylene chloride and 26.6 g of triethylamine and the mixture was stirred for 3 hours at room temperature. Water was added and the mixture was decanted. The aqueous phase was saturated with sodium chloride and was extracted 5 times with ethyl acetate. The organic extracts were dried over sodium sulfate and evaporated to dryness under reduced pressure to obtain 19 g of raw product which was dissolved in 190 ml of ethyl acetate. 80 g of florsil were added to the solution which was then stirred, treated with activated carbon and filtered. The filtrate was washed with ethyl acetate and was evaporated to dryness under reduced pressure to obtain 16.5 g of product which was crystallized from isopropyl ether to obtain 11 g of N-methoxy-2-methyl-5-thiazolecaboxamide melting at 78° C.

Analysis: $C_6H_8N_2O_2S$ Calculated: %C, 41.84; %H, 4.68; %N, 16.26; %S, 18.61; Found: %C, 41.9; %H, 4.7; %N, 16.1; %S, 18.7.

EXAMPLE 3

N-methoxy-N,2-dimethyl-5-thiazolecarboxamide 5.5 g of 2-methyl-5-thiazolecarboxylic acid chloride were added dropwise with stirring to a mixture of 5 g of O-methyl-N-methyl-hydroxylamine hydrochloride 140 ml of methylene chloride and 7 ml of triethylamine and the stirring was continued for 30 minutes. The mixture was poured into a water-ice mixture and was then decanted. The aqueous phase was extracted with methylene chloride and the organic extracts were washed with water, dried over sodium sulfate and evaporated to dryness. The 7.7 g of crystal residue was dissolved in methanol and the solution was treated with activated carbon, refluxed for 30 minutes and was filtered. The filter was washed with methanol and the filtrate was evaporated to dryness under reduced pressure. The residue was crystallized from petroleum ether to obtain 4.7 g of N-methoxy-N,2-dimethyl-5-thiazolecarboxamide melting at 33° C.

Analysis: $C_7H_{10}N_2O_2S$ Calculated: %C, 45.14; %H, 5.41; %N, 15.04; %S, 17.21: Found: %C, 45.4; %H, 5.6; %N, 15.0; %S, 17.4.

EXAMPLE 4

Tablets were prepared containing 25 mg of N-methoxy-2-methyl-thiazolecarboxamide or N-methoxy-N,1-dimethyl-5-thiazolecarboxamide and sufficient excipient of lactose, starch, talc and magnesium stearate for a final weight of 500 mg.

PHARMACOLOGICAL DATA

A. Acute toxicity

The acute toxicity of the products of Examples 1, 2 and 3 was determined on groups of 10 mice weighing between 18 and 22 g and the product was administered intraperitoneally as a suspension in carboxymethylcellulose. The animals were observed for one week and the average lethal dose ($LD_{50}$) was found to be greater than 1000 mg/kg in all 3 cases.

B. Antilipolytic Activity

Male rats of the Sprague Dawley SPF strain weighing about 180 to 200 g were starved for 24 hours and then were given the product of Examples 1, 2 and 3 orally. One hour after the oral administration, the animals were killed by carotidienne section and samples of the blood were obtained to determine the dosage of free fatty acids. The extraction of the free fatty acids was made by the technique of Dole [J. Clin. Invest., Vol. 38 (1959), p. 1544–1554] as modified by Trout et al [J. Lipid. Res., Vol. 1 (1960) p. 199–202]. The plasmatic extract free of phospholipids was colorimetrically determined by the method of Anthonis [J. Lipid. Res., Vol. 6 (1965), p. 307–312]. Under these test conditions, the dose of the products which reduced by 50% the level of free fatty acids in the treated animals as compared to the controls ($AD_{50}$) was found to be 5 mg/kg, 2 mg/kg and 2 mg/kg respectively, for the products of Examples 1, 2 and 3.

C. Cutaneous vasodilatatory effect

The cutaneous vasodilatatory effect was determined on albino Guinea Pigs and was manifested by the appearance of a reddening of the ears after a certain latency time. The animals were not fed and the products of Examples 1 and 2 were orally administered. The time for the reddening appearance of the ears and the duration and intensity was noted on a subjective scale of 1 to 3. At a dose of 20 mg/kg, the latency period was 16 and 9 minutes for a duration of 91 and 97 minutes and an intensity of 2.8 and 3 for the products of Examples 1 and 2, respectively. The vasodilatatory activity is manifested at doses more elevated than antilipolytic activity and it appears only after a fairly important latency time.

D. Hypoglycemic Activity

Male rats of the Sprague Dawley SPF strain weighing between 180 and 200 g were not fed for 24 hours and were then given the test product orally. One hour after administration, the animals were killed by carotidienne section and blood samples were taken to determine the glycemia. The seric extract was determined by the enzymatic (glucose-oxydose) method of Boehringer and the percent of reduction of glycemia as compared to the controls was determined. The results are reported in Table I.

TABLE I

| Product of Examples | Dose in mg/kg | % reduction of glycemia |
|---|---|---|
|  | 1 | −13 |
| 2 | 2 | −31 |
|  | 10 | −25 |
|  | 1 | −14 |
| 3 | 2 | −15 |
|  | 5 | −24 |

The results of Table I shows that the tested products exhibit a clear hypoglycemic activity.

Various modifications of the products and methods of the invention may be made without departing from the spirit or scope thereof and it is to be understood that the invention is intended to be limited only as defined in the appended claims.

We claim:

1. A compound of the formula

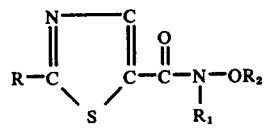

wherein R, $R_1$ and $R_2$ are individually selected from the group consisting of hydrogen and alkyl of 1 to 6 carbon atoms and their non-toxic, pharmaceutically acceptable acid addition salts 2. A compound of claim 1 wherein R is alkyl of 1 to 6 carbon atoms.

3. A compound of claim 2 wherein $R_1$ is hydrogen.

4. A compound of claim 1 which is N-hydroxy-2-methyl-5-thiazolecarboxamide.

5. A compound of claim 1 which is N-methoxy-2-methyl-5-thiazolecarboxamide.

6. A compound of claim 1 which is N-methoxy-N,2-dimethyl-5-thiazolecarboxamide.

7. An hypolipemiant composition comprising an hypolipioneantly effective amount of at least one compound of claim 1 and an inert pharmaceutical carrier 8. A method of inducing antilipolytic activity in humans comprising administering to humans an antilipolytically effective amount of at least one compound of claim 1.

9. An hypoglycemiant composition comprising an hypoglycemically effective amount of at least one compound of claim 1 and an inert pharmaceutical carrier.

10. A method of inducing hypoglycemic activity in humans comprising administering to humans an hypoglycemically effective amount of at least one compound of claim 1.

11. A method of inducing hypoglycemic and antilipolytic activities in humans comprising administering to humans hypolgycemically and antilipolytically effective amounts of at least one compound of claim 1.

12. The method of claim 11 wherein R is alkyl of 1 to 6 carbon atoms and $R_1$ is hydrogen.

13. The method of claim 8, 10 or 11 wherein the compond is N-hydroxy-2-methyl 5-thiazolecarboxamide.

14. The method of claim 8, 10 or 11 wherein the compound is N-methoxy-2-methyl-5-thiazolecarboxamide.

15. The method of claim 11 wherein the compound if N-methoxy-N,2-dimethyl-5-thiazolecarboxamide.

* * * * *